United States Patent [19]
Kobayashi

[11] Patent Number: 4,569,134
[45] Date of Patent: Feb. 11, 1986

[54] TRIMMING CORD FOR CUTTER

[75] Inventor: Isamu Kobayashi, Shiga, Japan

[73] Assignee: Kabushiki Kaisha Marunaka Seisakusho, Kyoto, Japan

[21] Appl. No.: 529,695

[22] Filed: Sep. 2, 1983

[30] Foreign Application Priority Data

Sep. 8, 1982 [JP] Japan .................. 57-137038[U]

[51] Int. Cl.⁴ .................. A01D 34/84; A01D 55/00
[52] U.S. Cl. .................................. 30/347; 56/12.7
[58] Field of Search ............... 30/276, 347; 56/12.7

[56] References Cited

U.S. PATENT DOCUMENTS

| | | | |
|---|---|---|---|
| 3,781,991 | 1/1974 | Stretton | 30/276 |
| 4,148,141 | 4/1979 | Hoff | 30/276 |
| 4,250,623 | 1/1981 | Pittinger | 30/347 |
| 4,301,642 | 11/1981 | Thurber | 56/12.7 |
| 4,316,325 | 2/1982 | Brucker | 30/276 |

FOREIGN PATENT DOCUMENTS 2756940  6/1979  Fed. Rep. of Germany ........ 30/276

Primary Examiner—Jimmy C. Peters
Attorney, Agent, or Firm—Browdy and Neimark

[57] ABSTRACT

This invention relates to a trimming cord for a cutter which cuts weeds or the like. In accordance with the invention, rotary discs provided on the output shaft of gearing are shaped like a reel and elongated wire-like trimming cords are wound onto it in the direction opposite to the direction of rotation of the reel-shaped rotary discs. A plurality of guide support rods are positioned equidistantly around an outer circumferential opening of the reel-shaped rotary discs so that the wire-like trimming cords wound onto the reel-shaped rotary disc are thrown outward from the outer circumferential opening of the rotary discs and are rotated by the centrifugal force of the rotation of the rotary discs. During repeated cutting of weeds and the like, the wire-like trimming cords gradually wear out and their ends become shorter so that each trimming cord gradually approaches the guide support rod supporting its base portion. In this case, since centrifugal force is always applied to the wire-like trimming cords, each trimming cord escapes from the guide support rod supporting it and, while supported at a suitable position by another guide support rod adjacent to the previous one in the rotational direction, it can be thrown automatically outward from the circumferential opening of the reel-shaped rotary discs. Hence the cutting can be performed continuously.

3 Claims, 3 Drawing Figures

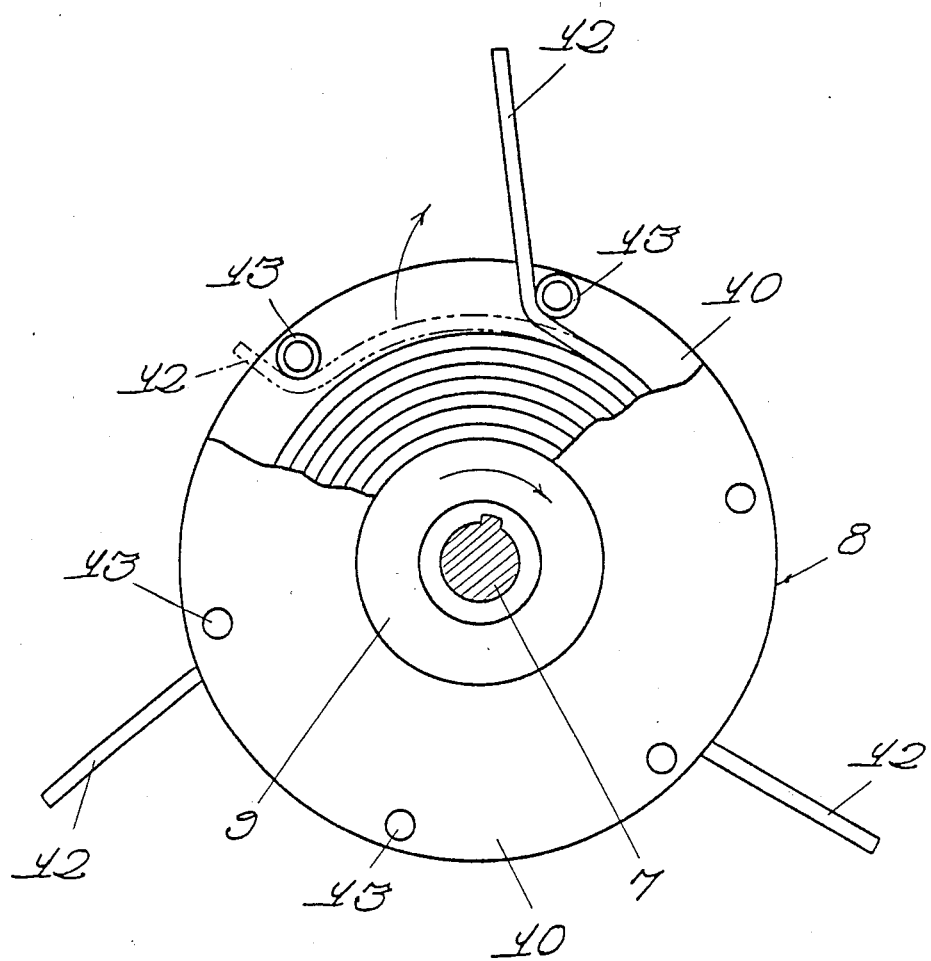

TRIMMING CORD FOR CUTTER

BACKGROUND OF THE INVENTION

This invention relates to a trimming cord for a cutter for cutting weeds, various trees, lawns, pasture, and cereals such as rice.

Conventional cutters of this kind usually have the following construction. A small engine is provided at the base of an elongated hollow rod and a rotary shaft for transmitting the rotation from the engine is inserted into the hollow rod. Gearing is provided at the end of the hollow rod to transmit the rotation of the rotary shaft in the hollow rod to an input shaft, and trimming cords are attached to an output shaft thereof. The cutting is carried out while holding the hollow rod.

Trimming cords for these cutters include saw-like rotary trimming cords, hatchet-like rotary trimming cords, and wire-like trimming cords formed by attaching wire-like trimming cords of metal wire or synthetic resin wire radially onto a rotary disc. The first two types of cord are extremely dangerous because the trimming cords are left exposed when the cutter is not in use, and their impact during cutting is relatively large so that cutting over an extended period of time is difficult. A cutter using the wire-like trimming cords is free from these problems because there is no danger even if the trimming cords are left exposed, and the impact during cutting is relatively small so that cutting over an extended period of time is possible. The problem with these trimming cords, however, is that abrasion and damage to wire-like trimming cords is so vigorous that they must be replaced frequently.

SUMMARY OF THE INVENTION

In order to eliminate the problems with the wire-like trimming cords of the prior art described above, the present invention is directed to providing a trimming cord for a cutter having a construction in which rotary discs on the output shaft of transmission gearing are shaped like a reel, elongated wire-like trimming cords are wound onto the reel-shaped rotary discs in a direction opposite to the direction of rotation of the rotary discs, and a plurality of guide support rods are positioned equidistantly around the outer circumferential opening of the reel-shaped rotary discs. According to this construction, when the reel-shaped rotary discs are rotated at high speed by the gearing, the ends of the wire-like trimming cords wound onto the rotary discs are thrown outward from the outer circumferential opening of the discs, while being suupported at suitable positions by the guide support rods, by the centrifugal force of rotation of the rotary disc, and the cutting of weeds or the like can be performed effectively by the wire-like trimming cords rotating as they are thrown outward.

Another object of the present invention is to provide a trimming cord for a cutter having the construction in which rotary discs on the output shaft of a transmission gear are shaped like a reel, elongated wire-like trimming cords are wound onto the reel-shaped rotary discs in a direction opposite to the direction of rotation of the rotary discs, and a plurality of guide support rods are positioned equidistantly around an outer circumferential opening of the reel-shaped rotary discs, wherein the wire-like trimming cords are thrown outward from the outer circumferential opening of the rotary discs when the reel-shaped rotary discs are rotated at high speed, and when a wire-like trimming cord wears out after repeated cutting of weeds and the like so that its end is shorter and comes closer to the guide support rod supporting its base portion, the trimming cord eventually escapes from the guide support rod supporting it and is then supported by another guide support rod adjacent to the first in the direction of rotation of the reel-shaped rotary disc, and can thus be thrown outward automatically from the outer circumferential opening of the rotary discs, thereby making it possible to continue the cutting, because centrifugal force is always applied to the wire-like trimming cords.

Still another object of the present invention is to provide a trimming cord for a cutter having a construction in which reel-shaped rotary discs on the output shaft of a gearing consists of a plurality of reel-shaped rotary discs that are superposed over one another so that a plurality of wire-like trimming cords can be thrown outward from the outer circumferential openings of the reel-shaped rotary discs and be rotated by the rotation of the rotary discs.

Thus, the gist of the present invention resides in a trimming cord for a cutter characterized in that gearing driven by a small engine is provided at the end of an elongated hollow rod with the small engine at its base. Elongated wire-like trimming cords are wound onto reel-shaped rotary discs in the direction opposite to the direction of rotation of the reel-shaped rotary discs, and a plurality of guide support rods are positioned equidistantly around the outer circumferential opening of the reel-shaped rotary discs so that the wire-like trimming cords wound onto the reel-shaped rotary discs are thrown outward from the outer circumferential opening of the rotary disc and are rotated by the rotation of the reel-shaped rotary discs.

BRIEF DESCRIPTION OF THE DRAWINGS

FIG. 3 is a partially cut-away plan view of the principal portions of the cutter.

DESCRIPTION OF THE PREFERRED EMBODIMENT

Figure 1:
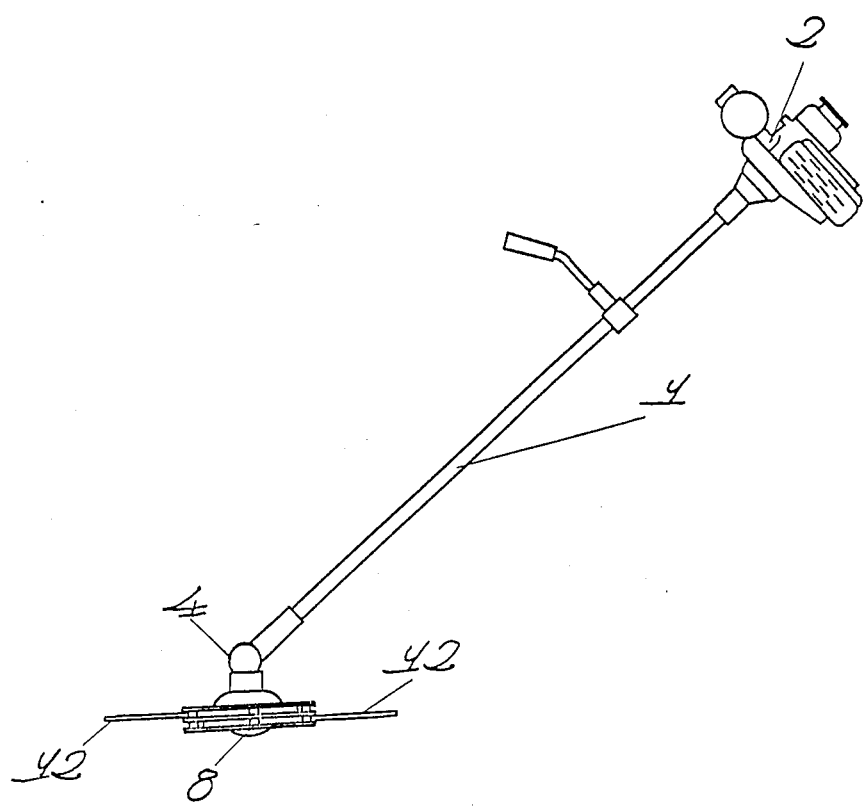
FIG. 1 is a side view of a complete cutter.
Figure 2:
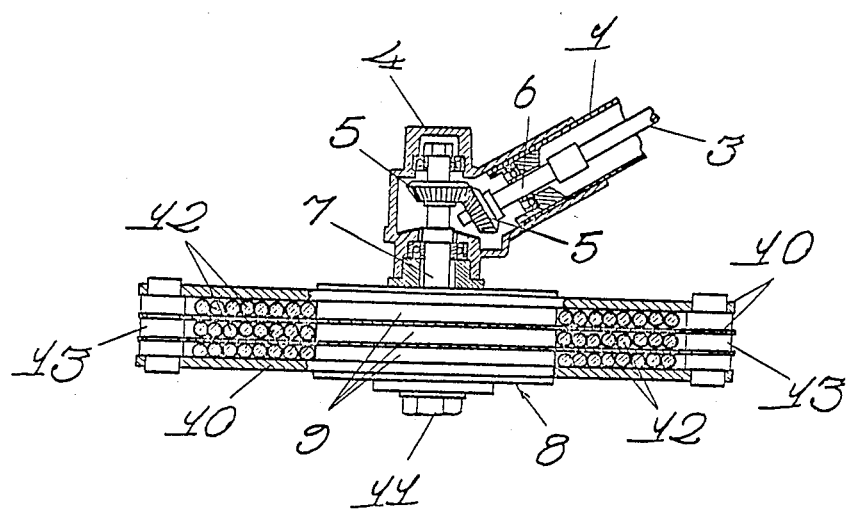
FIG. 2 is a longitudinally sectioned side view of the principal portions of the cutter.

Hereinafter one preferred embodiment of the present invention will be described with reference to the accompanying drawings.

In the drawings, reference numeral 1 represents an elongated hollow rod which is equipped with a handle and a shoulder belt. Cutting is effected by holding this hollow rod 1. Reference numeral 2 represents a small engine provided at the base of the hollow rod 1, this is a driving device for rotating trimming cords, Reference numeral 3 represents a rotary shaft which is inserted into the hollow rod 1 and is rotated by the small engine 2. Reference numeral 4 represents gearing provided at the end of the hollow rod 1 and which has therein bevel gears 5, etc. The rotary shaft 3 of the small engine 2 is connected to an input shaft 6 of the bearing 4 to transmit the rotation of the small engine 2 to the gearing 4, which adjusts the rotational speed and changes the direction of rotation of the rotary shaft. Reference numeral 7 represents an output shaft of the gearing 4. Reference numeral 8 represents a reel-shaped rotary disc consisting of a winding drum 9 of small diameter and side walls 10 of large diameter that are positioned in such a manner that they sandwich the winding drum 9 from above and below. The reel-shaped rotary disc 8 may be provided as a plurality of stages by superposing a plurality of discs 8, or by alternately superposing a plurality of each of winding drums 9 and side walls 10. The reel-shaped rotary disc 8 is attached removably onto the output shaft 7 of the gearing 4 by a fitting nut 11 or the like, and rotates integrally with the output shaft 7.

Reference numeral 12 represents wire-like trimming cords consisting of elongated metal wires, wires of a synthetic resin such as nylon, or those of gut or the like. The wires are wound onto the winding drum 9 of the reel-shaped rotary disc 8 in the direction opposite to the direction of rotation of the disc 8. The trimming cords 12 thus wound are preferably supported by the upper and lower side walls 10 to such an extent that they cannot be released easily. Reference numeral 13 represents a guide support rod. A plurality of these rods 13 are positioned equidistantly between the side walls 10 within the open portion around the outer circumference of the reel-shaped rotary disc 8. When the reel-shaped rotary disc 8 is rotated at high speed, these guide support rods 13 guide and support the ends of the wire-like trimming cords 12 wound onto the winding drum 9 of the rotary disc 8 at suitable positions by the centrifugal force of the rotation, to let the ends of the trimming cords 12 project outward from the outer circumferential opening of the reel-shaped rotary disc 8. The guide support rods 13 also support the outer circumferential portion of the trimming cords 12 wound onto the winding drum 9 and prevent the trimming cords from being released. The length of the wire-like trimming cords 12 thrown outward from the outer circumferential opening of the reel-shaped rotary disc 8 can be adjusted by providing a large number of equidistant support holes so as to adjust the support gaps between the guide support rods 13.

The trimming cords of the cutter in accordance with the present invention are constructed as described above. When the small engine 2 operates and the reel-shaped rotary disc 8 is rotated at high speed by the transmission gear 4, the ends of the wire-like trimming cords 12 wound onto the winding drum 9 of the reel-shaped rotary disc 8 are thrown outward from the outer circumferential opening of the rotary disc 8 by the centrifugal force, while being supported at suitable positions by the guide support rods 13, and weeds and the like can be cut effectively by the wire-like trimming cords 12 that rotate as they are thrown outward.

During extended cutting of weeds or the like, the wire-like trimming cords 12 gradually wear out so that their ends becomes shorter to such an extent that they gradually approach the guide support rods 13 supporting the base portions of the trimming cords, represented by dashed lines in the drawings. Since the centrifugal force of the rotation is always applied to the wire-like trimming cords 12, however, each trimming cord 12 escapes from the support of the corresponding guide support rod 13 and is automatically thrown outward from the outer circumferential opening of the reel-shaped rotary disc 8, but held at a suitable position by another guide support rod 13 adjacent to the previous one in the rotational direction. Hence the cutting can be performed continuously.

What is claimed is:

1. A trimming cord assembly for a cutter, comprising:
an output shaft driven to rotate in a predetermined direction by a drive means;
at least one winding drum connected to said output shaft;
rotary discs connected to said output shaft, each pair of adjacent rotary discs cooperating with said at least one winding drum to form a reel having an outer circumferential opening;
one elongated wire-like trimming cord wound onto each said reel, in a single axial layer, in the direction opposite said predetermined direction of rotation of said output shaft, said rotary discs being separated by the distance of one layer of said trimming cord; and
a plurality of guide support rods positioned equidistantly around the outer circumferential opening of said reel,
whereby said wire-like trimming cord wound onto said reel is thrown outward from the outer circumferential opening of said reel and is rotated by the centrifugal force of the rotation of said reel.

2. The trimming cord assembly for a cutter, as defined in claim 1, wherein at least three of said rotary discs are superposed one over another to form, in cooperation with said at least one winding drum, at least two of said reels therebetween, said guide support rods extending between all of said discs; and wherein a separate elongated wire-like trimming cord is wound onto each said reel, each said trimming cord being wound in the direction opposite said predetermined direction of rotation of said output shaft.

3. A trimming cord assembly for a cutter, as defined in claim 1, wherein said rotary discs include a plurality of support means formed equidistantly on the circumference thereof, each of said support means for supporting one of said guide support rods, the number of said support means being larger than the number of said guide support rods thereby permitting the gaps between the plurality of said guide support rods to be adjustable.

* * * * *